(12) United States Patent
Kawasaki et al.

(10) Patent No.: US 10,837,490 B2
(45) Date of Patent: Nov. 17, 2020

(54) SEPARATOR, MACHINE ELEMENT, MOTION GUIDE DEVICE AND INDUSTRIAL MACHINE

(71) Applicants: Kureha Gohsen Co., LTD., Tochigi (JP); THK Co., LTD., Tokyo (JP)

(72) Inventors: Masahiro Kawasaki, Tochigi (JP); Daisuke Mimori, Tochigi (JP); Yasuaki Takaiwa, Tochigi (JP); Kenichi Saitoh, Tochigi (JP)

(73) Assignees: KUREHA GOHSEN CO., LTD, Tochigi (JP); THK CO., LTD., Tokyo (JP)

( * ) Notice: Subject to any disclaimer, the term of this patent is extended or adjusted under 35 U.S.C. 154(b) by 0 days.

(21) Appl. No.: 16/342,579

(22) PCT Filed: Jun. 28, 2017

(86) PCT No.: PCT/JP2017/023801
§ 371 (c)(1),
(2) Date: Apr. 17, 2019

(87) PCT Pub. No.: WO2018/083838
PCT Pub. Date: May 11, 2018

(65) Prior Publication Data
US 2020/0056657 A1 Feb. 20, 2020

(30) Foreign Application Priority Data
Nov. 4, 2016 (JP) .................................. 2016-216678

(51) Int. Cl.
*F16C 29/06* (2006.01)
*F16H 25/24* (2006.01)
(Continued)

(52) U.S. Cl.
CPC .......... *F16C 29/06* (2013.01); *F16C 29/0623* (2013.01); *F16H 25/2204* (2013.01);
(Continued)

(58) Field of Classification Search
CPC .... F16C 29/005; F16C 29/06; F16C 29/0623; F16C 2208/20; F16H 25/2204; F16H 25/24; B29C 2045/363
(Continued)

(56) References Cited

U.S. PATENT DOCUMENTS 5,389,725 A 2/1995 Bando
6,247,846 B1 * 6/2001 Shirai ................. F16C 29/0642
384/45
(Continued)

FOREIGN PATENT DOCUMENTS

JP 2003148467 A 5/2003
JP 2007285346 A 11/2007
(Continued)

OTHER PUBLICATIONS

International Preliminary Report on Patentability for PCT/JP2017/023801 dated May 16, 2019, 7 pages.
(Continued)

*Primary Examiner* — Marcus Charles
(74) *Attorney, Agent, or Firm* — Abel Schillinger, LLP

(57) ABSTRACT

Provided is a bearing retainer (1) which has excellent oil resistance and impact resistance. The bearing retainer (1) retains a plurality of balls in such a manner that the balls are apart from each other. In a ball screw that is provided with a first member and a second member which moves relatively to the first member, the plurality of balls is arranged on one of the first member or the second member so as to be in contact with both of the first member and the second member, and rolling of the balls enables the relative move-
(Continued)

ment. This bearing retainer (1) is formed from a resin composition that contains an elastomer component and a fluororesin which is mainly composed of vinylidene fluoride.

13 Claims, 1 Drawing Sheet

(51) Int. Cl.
*F16H 25/22* (2006.01)
*B29C 45/36* (2006.01)
*F16C 29/00* (2006.01)

(52) U.S. Cl.
CPC ...... *B29C 2045/363* (2013.01); *F16C 29/005* (2013.01); *F16C 2208/20* (2013.01); *F16H 25/24* (2013.01)

(58) Field of Classification Search
USPC .................... 384/43, 45, 49, 521; 74/424.82
See application file for complete search history.

(56) References Cited

U.S. PATENT DOCUMENTS

| | | | |
|---|---|---|---|
| 7,806,017 B2* | 10/2010 | Osterlaenger | F16C 33/3818 74/424.82 |
| 7,938,583 B2 | 5/2011 | Tanaka et al. | |
| 8,511,897 B2* | 8/2013 | Kuo | F16C 29/0638 384/45 |
| 9,133,877 B2* | 9/2015 | Yamazaki | F16C 29/0607 |
| 10,137,731 B2* | 11/2018 | Willis | B60B 33/00 |
| 2003/0035600 A1* | 2/2003 | Michioka | F16C 29/065 384/44 |
| 2007/0147714 A1* | 6/2007 | Matsumoto | F16C 43/06 384/45 |
| 2007/0232502 A1* | 10/2007 | Tsutsui | F16C 33/201 508/104 |
| 2008/0032112 A1* | 2/2008 | Hirata | C08J 9/26 428/304.4 |
| 2008/0085070 A1* | 4/2008 | Hirata | F16C 33/6648 384/470 |
| 2012/0156468 A1 | 6/2012 | Masumura et al. | |
| 2016/0193764 A1 | 7/2016 | Masumura et al. | |

FOREIGN PATENT DOCUMENTS

| | | |
|---|---|---|
| WO | 93/21272 A1 | 10/1993 |
| WO | WO2003080306 A1 | 10/2003 |
| WO | 2009/020182 A1 | 2/2009 |

OTHER PUBLICATIONS

International Search Report for PCT/JP2017/023801 dated Aug. 1, 2017.
Translation of the International Search Report for PCT/JP2017/023801 dated Aug. 1, 2017.

* cited by examiner

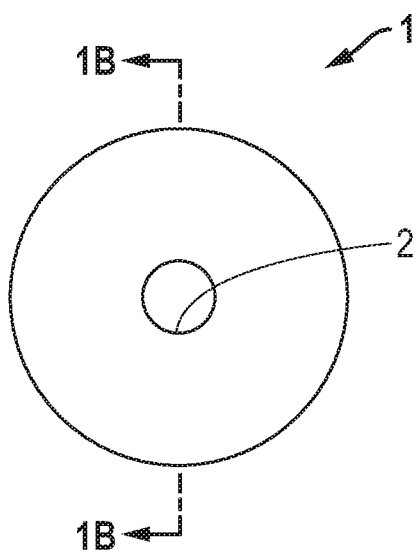
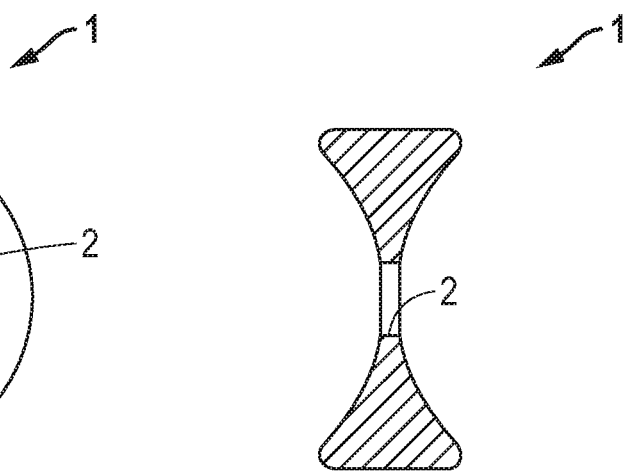
FIG. 1A          FIG. 1B
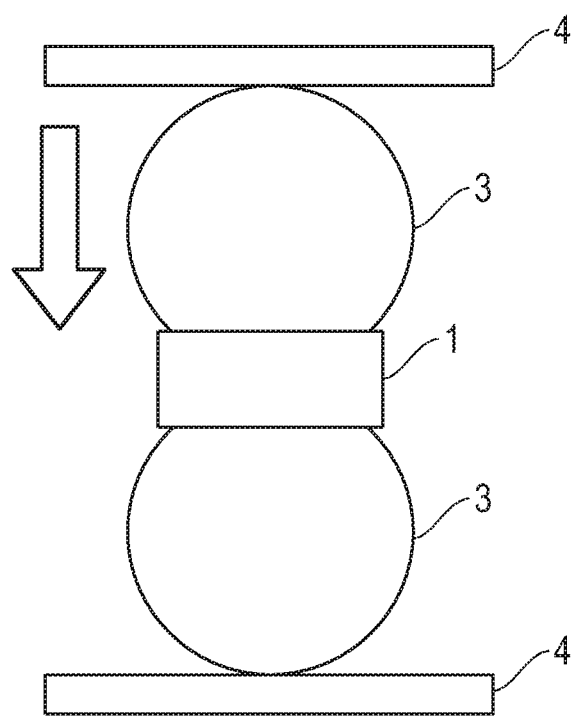
FIG. 2

SEPARATOR, MACHINE ELEMENT, MOTION GUIDE DEVICE AND INDUSTRIAL MACHINE

TECHNICAL FIELD

The present invention relates to a separator, a machine element, a motion guide device, and an industrial machine. More specifically, the present invention relates to a separator used in a machine element, a machine element that uses the separator, a motion guide device having the machine element, and an industrial machine having the motion guide device.

BACKGROUND ART

The ball screw is a machine component that converts linear motion to rotational motion or that converts rotational motion to linear motion. The ball screw includes a threaded shaft, a nut configured to mate with the threaded shaft, and a plurality of balls that are installed in a thread groove formed in the inner circumference of the nut and that rotate and circulate to transfer the threaded shaft. Furthermore, in between the balls, a bearing retainer that retains the balls in a manner so that the balls are apart from each other to avoid the contact between the balls is provided. By allowing the bearing retainer to be present in between the balls, noise caused by the contact between the balls can be avoided. Furthermore, because no mutual friction between the balls occurs, fluctuation of torque becomes smaller and smooth motion is achieved. Furthermore, because grease can be retained in the bearing retainer, maintenance is not needed for a long period of time.

In the related art, for bearing retainers, resin compositions containing a resin such as nylon have been used. In such a resin composition, an inorganic filler that exhibits reinforcing effect, such as a glass fiber or a carbon fiber, is blended to enhance impact resistance and compression resistance. However, nylon exhibits high water absorption, changes the dimension due to the condition of water absorption, and thus may cause problems in the operation of the ball screw.

In response to such problems, Patent Document 1 describes the use of a separator (bearing retainer) formed from a fluororesin which is less likely to change the dimension, such as a tetrafluoroethylene-ethylene copolymer (ETFE), in a linear motion device.

CITATION LIST

Patent Literature

Patent Document 1: JP 2003-148467 A (Published on May 21, 2003)

SUMMARY OF INVENTION

Technical Problem

In recent years, ball screws are used in high-load environment and high-speed environment, and the use environment has been diversified. Furthermore, as the use environment of ball screws is diversified, for the used chemicals and oil agents, novel chemicals and oil agents have been developed. As the use environment is diversified, even higher impact resistance and higher durability of a bearing retainer, which is a component of a ball screw, have been demanded.

For example, a nylon bearing retainer has a problem of low oil resistance in addition to the problem of water absorbability described above. Specifically, a problem of dissolution of a bearing retainer may occur due to a lubricating oil introduced to decrease the friction between a nut or a threaded shaft and a ball because the nylon bearing retainer has low oil resistance. Therefore, problems exist in that the bearing retainer is torn while the ball screw is in operation because the strength of the nylon bearing retainer decreases depending on the use environment. Furthermore, a nylon bearing retainer contains an inorganic filler to enhance impact resistance and compression resistance; however, a resin containing an inorganic filler has high friction, and there is a problem in that the strength of the welded portion (weld) of the resin becomes lower.

As a substitute for a nylon bearing retainer, there is a bearing retainer using a fluororesin, such as a bearing retainer described in Patent Document 1; however, as a result of study of the inventors of the present invention, it was found that impact resistance and compression resistance are not sufficient. Although Patent Document 1 describes a bearing retainer formed from ETFE, typically, ETFE has the molding temperature and the pyrolysis temperature that are close to each other, and there is a problem of molding processability. Furthermore, ETFE also has a problem of relatively high cost, and use of another raw material has been demanded.

Therefore, an object of the present invention is to provide a separator having excellent oil resistance and at least excellent impact resistance.

Solution to Problem

To solve the problems described above, the separator according to an embodiment of the present invention is a separator configured to retain a plurality of spheres under a condition that the spheres are apart from each other; in a motion guide device comprising a first member and a second member which moves relatively to the first member, the plurality of spheres being arranged on one of the first member or the second member and being in contact with both of the first member and the second member, and rolling of the spheres enabling the relative movement; and the separator including a fluororesin containing vinylidene fluoride as a main component and a resin composition containing an elastomer component.

Advantageous Effects of Invention

According to the present invention, a separator having excellent oil resistance and excellent impact resistance can be provided.

BRIEF DESCRIPTION OF THE DRAWINGS

FIGS. 1A and 1B illustrate an embodiment of the bearing retainer of the present embodiment.

FIG. 1A is a front view, and FIG. 1B is a cross sectional view along the arrow—1B-1B—of FIG. 1A.

FIG. 2 is a drawing for explaining compression test in examples.

DESCRIPTION OF EMBODIMENTS

An embodiment of the separator of the present invention will be described below in detail.

The separator of an embodiment of the present invention can be used as a component of a machine element and a component of a motion guide device. The separator of an embodiment of the present invention can be especially preferably used as a bearing retainer, which is a component of a ball screw, and thus an example of a bearing retainer used in a ball screw is described below; however, the separator of the present invention is not limited to this.

Ball Screw

The ball screw (motion guide device) is a machine component that converts linear motion to rotational motion or that converts rotational motion to linear motion. The ball screw is composed of a nut (machine element, first member), a threaded shaft that moves relatively to the nut (machine element, second member), and a plurality of balls (spheres) provided on the nut. The bearing retainer (separator) is provided in between the balls in a manner that the plurality of balls is separated from each other. The ball is provided in a thread groove of the nut in a manner that the ball is in contact with both the nut and the threaded shaft. By allowing one of the threaded shaft or the nut to move rotationally, thereby allowing the balls to roll and circulate in the thread groove, the ball screw of the present embodiment allows the other one of the threaded shaft and the nut to move linearly. The other configuration other than the bearing retainer may be the same configuration as that of a known ball screw in the related art.

Bearing Retainer

The bearing retainer of the present embodiment is formed from a fluororesin containing vinylidene fluoride as a main component and a resin composition containing an elastomer component.

The shape of the bearing retainer may be the same as a shape of a known bearing retainer in related art used in a known ball screw in the related art. That is, the bearing retainer may have a shape that can separate the balls while being in contact with the balls and that is not in contact with the nut and the threaded shaft. A specific example is shown in FIGS. 1A and 1B. FIG. 1A is a front view of a bearing retainer 1, and FIG. 1B is a cross sectional view along the arrow —1B-1B—of FIG. 1A. As illustrated in FIG. 1B, the bearing retainer 1 has a mortar structure in which the both end portions of a laid cylinder are concave inward and by which a ball fits into the mortar. Furthermore, a through hole 2 is provided in a center portion of the bearing retainer 1.

Fluororesin

The fluororesin in the present embodiment is a fluororesin containing vinylidene fluoride as a main component. In the present specification, "main component" indicates the condition where the amount thereof is 50% or greater of the entire amount. That is, "fluororesin containing vinylidene fluoride as a main component" is a resin containing 50 mol % or greater of a constituent unit corresponding to vinylidene fluoride (hereinafter, "vinylidene fluoride monomer unit"). In particular, the fluororesin containing vinylidene fluoride as the main component preferably contains 80 mol % or greater, more preferably 85 mol % or greater, and even more preferably 90 mol % or greater, of the vinylidene fluoride monomer unit, and is especially preferably a homopolymer of vinylidene fluoride. The molding temperature and the pyrolysis temperature of the polyvinylidene fluoride are not close each other compared to the case of other fluororesins, such as a tetrafluoroethylene-ethylene copolymer. Therefore, the fluororesin containing vinylidene fluoride as the main component has an advantage of excellent processability compared to the other fluororesin. Therefore, the range of the content of the vinylidene fluoride monomer unit is preferable from the perspective of processing moldability of the bearing retainer. Furthermore, the fluororesin containing vinylidene fluoride as the main component exhibits superior oil resistance to that of nylon.

Because the fluororesin containing vinylidene fluoride as the main component needs to contain at least 50 mol % of the vinylidene fluoride monomer unit as described above, the fluororesin may be a copolymer of vinylidene fluoride and another monomer or a homopolymer only formed from vinylidene fluoride.

In the case where the fluororesin is a copolymer, examples of another monomer to be copolymerized with the vinylidene fluoride include fluorine-containing alkyl vinyl compounds, such as hexafluoropropylene, trifluoroethylene, tetrafluoroethylene, and chlorotrifluoroethylene; cyclic monomers, such as ethylene oxalate (i.e. 1,4-dioxane-2,3-dione), lactides, lactones (e.g. β-propiolactone, β-butyrolactone, β-pivalolactone, γ-butyrolactone, δ-valerolactone, β-methyl-δ-valerolactone, ε-caprolactone, and the like), carbonates such as trimethylene carbonate, ethers such as 1,3-dioxane, ether esters such as dioxanone, and amides such as ε-caprolactam; hydroxycarboxylic acids such as lactic acid, 3-hydroxypropanoic acid, 3-hydroxybutanoic acid, 4-hydroxybutanoic acid, and 6-hydroxycaproic acid, and the alkyl esters thereof; aliphatic diols such as ethylene glycol and 1,4-butanediol, and the alkyl esters thereof; and aliphatic dicarboxylic acids such as succinic acid and adipic acid, and the alkyl esters thereof. Among these, hexafluoropropylene, trifluoroethylene, tetrafluoroethylene, and chlorotrifluoroethylene are preferable. One type of these other monomers may be used, or a combination of a plurality of these may be used.

The inherent viscosity of the fluororesin of the present embodiment is preferably in the range of 0.50 dL/g to 1.30 dL/g, more preferably in the range of 0.60 dL/g to 1.20 dL/g, and most preferably in the range of 0.70 dL/g to 1.10 dL/g. Note that the inherent viscosity refers to logarithmic viscosity. Use of the fluororesin having the inherent viscosity in the range of 0.50 dL/g to 1.30 dL/g is preferable from the perspectives of ease in molding and molding into a shape of the bearing retainer.

In the present specification, the inherent viscosity of the fluororesin is calculated as the logarithmic viscosity at 30° C. of a solution obtained by dissolving 4 g of the fluororesin in 1 liter of N,N-dimethylformamide. Specifically, the inherent viscosity is determined by the following expression.

$$\eta_i = (1/C) \cdot \ln(\eta/\eta_0)$$

In the expression, $\eta$ is the viscosity of the polymer solution, $\eta_0$ is the viscosity of N,N-dimethylformamide (solvent) alone, and C is 0.4 g/dL.

Elastomer Component

The elastomer component is not limited as long as the elastomer component contains an elastomer. As the elastomer, styrene-based, olefin-based, ester-based, urethane-based, amide-based, PVC-based, and acrylic elastomers can be used. Furthermore, among these elastomers, an elastomer containing a fluorine atom can be also used. In the present specification, "elastomer containing a fluorine atom" is referred to as "fluorine-based elastomer". Specific examples of the elastomer include rubbers, such as natural rubber, styrene-butadiene rubber, isoprene rubber, butadiene rubber, chloroprene rubber, acrylonitrile-butadiene rubber, acrylic rubber, butyl rubber such as isobutylene-isoprene rubber, ethylene-propylene rubber, ethylene-propylene-diene rubber, urethane rubber, and silicone rubber; and rubbers in which a part of hydrogen atoms of these rubbers is substituted with a fluorine atom.

In the present embodiment, from the perspective of compatibility with the fluororesin, an elastomer compatible with a fluororesin or a combination of a compound having high compatibility with a fluororesin and the elastomer described above is used as the elastomer component.

Examples of the elastomer compatible with the fluororesin include fluorine-based elastomers, acrylic elastomers, and the like. Among these, acrylic elastomers and fluorine-based elastomers are preferable, and an acrylic elastomer having a structural unit of methyl methacrylate (MMA) and a fluorine-based elastomer having a structural unit of vinylidene fluoride (VDF) are more preferable. An example of the acrylic elastomer is a block copolymer of MMA and butyl acrylate (BA) or a graft copolymer. By allowing MMA to be contained, compatibility with the fluororesin is enhanced, dispersibility in the fluororesin is enhanced, and impact resistance is enhanced.

Examples of the compound having high compatibility with a fluororesin include acrylic resins, fluororesins, and the like. Among these, an acrylic resin having a structural unit of MMA and a fluorine-based resin having a structural unit of VDF are preferable.

Note that the acrylic resin and the fluororesin may be respectively an acrylic elastomer and a fluorine-based elastomer.

When the compound having high compatibility with a fluororesin is used in combination with the elastomer described above as the elastomer component, means of combining the compound and the elastomer is not particularly limited. Examples thereof include a method of bonding the compound to the elastomer, a method of forming a core-shell structure by bonding the elastomer and the compound in a manner that the compound covers the elastomer, and the like. The core-shell structure is a structure composed of a core phase arranged inside and a shell phase covering the outer side of the core phase and having a component different from that of the core phase. The present embodiment has a configuration in which the core phase is the elastomer component and the shell phase is the compound having high compatibility with a fluororesin. Examples of the core-shell structure in the present embodiment include a configuration in which the core phase is BA and the shell phase is an MMA polymer, a configuration in which the core phase is a fluorine-based elastomer and the shell phase is an MMA polymer or a VDF polymer, and the like. However, the core-shell structure is not limited to these.

A commercially available product may be used as the elastomer component having the core-shell structure described above. Examples of the commercially available product include Paraloid EXL-2315 (available from The Dow Chemical Company), Metablen S-2006 (available from Mitsubishi Rayon Co., Ltd.), and the like.

By allowing the elastomer component in the present embodiment to be a core-shell structure, even when an elastomer having low compatibility with the fluororesin is used, the elastomer component can be dispersed in the fluororesin. By using the elastomer component having the core-shell structure, impact resistance is further enhanced, and compression resistance is enhanced. Furthermore, better kneadability in the resin composition is achieved, and variation between samples becomes less. The elastomer of the core phase may be an elastomer having high compatibility with the fluororesin.

The shape of the elastomer component is not particularly limited; however, in the present embodiment, a sphere is preferable. By allowing the shape of the elastomer component to be spherical, the elastomer component can be thoroughly dispersed in the fluororesin. Furthermore, no anisotropy exists because of the spherical shape, localized stress concentration is less likely to occur, and impact resistance is enhanced. Furthermore, during thermal expansion, strain is less likely to occur compared to the case of an elastomer component having another form. Furthermore, the size of the elastomer component is not particularly limited.

In the case where the elastomer component has a core-shell structure, the content of the elastomer component in the resin composition containing the fluororesin containing vinylidene fluoride as a main component and the elastomer component is preferably 1 part by mass or greater, more preferably 3 parts by mass or greater, even more preferably 5 parts by mass or greater, and particularly preferably 10 parts by mass or greater, per 100 parts by mass of the fluororesin. Furthermore, in the case where the elastomer component has a core-shell structure, the content is preferably 5 parts by mass or greater, more preferably 7 parts by mass or greater, and even more preferably 10 parts by mass or greater, per 100 parts by mass of the fluororesin. By setting the amount of the elastomer component to the range described above, a bearing retainer having high impact strength can be obtained. Furthermore, from the perspective of oil resistance of the bearing retainer, the content of the elastomer component is preferably 20 parts by mass or less, more preferably 17 parts by mass or less, and even more preferably 15 parts by mass or less, per 100 parts by mass of the fluororesin. Therefore, by adjusting the elastomer component to 1 part by mass or greater but 20 parts by mass or less, a bearing retainer having excellent oil resistance and high impact strength can be obtained. Note that, by adjusting the content of the elastomer component to 10 parts by mass or greater, even superior impact strength is achieved, and variation between samples becomes less. Furthermore, as the elastomer component, a combination with an elastomer having a core-shell structure and an elastomer having no core-shell structure may be used.

Other Components

The resin composition in the present embodiment may contain another component such as a filler and a solid lubricant as long as the effect of the resin composition of the present embodiment is not impaired.

Examples of the filler include inorganic fillers exhibiting reinforcing effect, such as glass fibers and carbon fibers. By blending such an inorganic filler, impact resistance of the bearing retainer can be enhanced. Note that, when injection molding is performed by using a resin composition containing such an inorganic filler, strength of the welded portion (weld) tends to be lower. Therefore, when a bearing retainer is molded by injection molding, no inorganic filler is preferably contained.

Examples of the solid lubricant include $MoS_2$, $WS_2$, graphite, and polytetrafluoroethylene. Note that, when injection molding is performed by using a resin composition containing such a solid lubricant, strength of the welded portion (weld) tends to be lower. Therefore, when a bearing retainer is molded by injection molding, no solid lubricant is preferably contained.

Molding Method

The bearing retainer of the present embodiment can be produced by a known production method. Specifically, a bearing retainer can be molded by injection molding. More specifically, the production can be performed by producing an ordinary mold based on a bearing retainer of a commercially available ball screw, and performing injection molding by using the mold. Note that the ordinary mold has a structure that forms a welded portion (weld) at least a part of the molded bearing retainer.

Other Aspect of Separator

As described above, an example of a bearing retainer used in between balls of a ball screw was described as an embodiment of the separator according to the present invention; however, the separator according to the present invention is not limited to this. As another embodiment of the separator according to the present invention, the form may be a ring structure and a cylindrical structure in addition to the form having the mortar structure described above. Examples of the separator having a ring structure include a form in which a plurality of balls is separated each other and mated in a ring in a manner that a part of each ball is exposed to both the inner circumferential side and the outer circumferential side of the ring. Furthermore, examples of the separator having a cylindrical structure include a form in which a plurality of through holes is provided on the side of the cylinder, a ball is mated in each through hole, and a part of each ball is exposed to both the inner side and the outer side of the side surface of the cylinder. The separator having the ring structure described above is, for example, used in a ball bearing of a bicycle. Furthermore, the separator having the cylindrical structure described above is used in a ball guide of a press mold. Therefore, ball bearings, ball guides, and the like are included in the machine element according to the present invention. As described above, the separator according to the present invention can be used in a component that requires oil resistance and impact resistance and also in a component that requires oil resistance, impact resistance, and compression resistance, besides the bearing retainer.

Furthermore, the separator can be suitably applied to an industrial machine even in an environment that applies high load to the ball screw as long as the industrial machine is an industrial machine having the ball screw described above. Therefore, the industrial machine having the motion guide device included in the present invention, such as the ball screw described above, is also included in the scope of the present invention. Examples of the industrial machine having a ball screw include injection molding devices, machine tools, and the like.

Furthermore, the motion guide device, such as a ball screw, may be an embodiment in which a first component moves relatively to a second component, and the movement of the first component is guided by the second component. Therefore, the first component of the motion guide device may be expressed as "movable body", and the other component may be expressed as "guide member".

That is, the separator according to the present invention can be used in general components that require oil resistance and impact resistance or components that require oil resistance, impact resistance, and compression resistance.

SUMMARY

The separator according to an embodiment of the present invention is a separator configured to retain a plurality of spheres under a condition that the spheres are apart from each other; in a motion guide device comprising a first member and a second member which moves relatively to the first member, the plurality of spheres being arranged on one of the first member or the second member and being in contact with both of the first member and the second member, and rolling of the spheres enabling the relative movement; and the separator comprising a fluororesin containing vinylidene fluoride as a main component and a resin composition containing an elastomer component.

In the separator according to an embodiment of the present invention, the elastomer component is preferably an elastomer combined with a compound compatible with the fluororesin.

In the separator according to an embodiment of the present invention, the elastomer combined with the compound compatible with the fluororesin is preferably an elastomer having a core-shell structure.

In the separator according to an embodiment of the present invention, the compound compatible with the fluororesin is preferably a fluororesin or an acrylic resin.

In the separator according to an embodiment of the present invention, the resin composition preferably contains 1 part by mass or greater of the elastomer component per 100 parts by mass of the fluororesin containing the vinylidene fluoride as the main component.

In the separator according to an embodiment of the present invention, the elastomer component is preferably an elastomer compatible with the fluororesin.

In the separator according to an embodiment of the present invention, the elastomer compatible with the fluororesin is preferably an acrylic elastomer or a fluorine-based elastomer.

In the separator according to an embodiment of the present invention, the resin composition preferably contains 5 parts by mass or greater of the elastomer component per 100 parts by mass of the fluororesin.

In the separator according to an embodiment of the present invention, the fluororesin is preferably polyvinylidene fluoride.

The machine element according to an embodiment of the present invention comprising the separator described above and a plurality of spheres; the separator retaining the plurality of spheres under a condition that the spheres are apart from each other.

The motion guide device according to an embodiment of the present invention comprising: a first member being the machine element described above, and a second member being another machine element configured to move relatively to the first member; the second member being combined with the first member under a condition that the second member is in contact with the plurality of spheres.

An aspect of the motion guide device according to the present invention is a ball screw.

The industrial machine according to an embodiment of the present invention has the motion guide device described above.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Example 1

In 100 parts by mass of polyvinylidene fluoride (PVDF) (KF polymer W #1000, available from Kureha Corporation)

as the fluororesin, 5 parts by mass of Paraloid EXL-2315 (available from The Dow Chemical Company) as the elastomer component was added and kneaded by using a twin screw extruder to prepare a resin composition. The prepared resin composition was injection-molded to produce a bearing retainer having a through hole illustrated in FIGS. 1A and 1B and a multi-purpose test piece (JIS K 7139 type A1). The bearing retainer was used for drop test and compression test described below, and the multi-purpose test piece was used for Charpy impact test.

Example 2

A bearing retainer and a test piece were produced by the same method as in Example 1 except for changing the amount of the elastomer component to 10 parts by mass.

Example 3

A bearing retainer and a test piece were produced by the same method as in Example 1 except for changing the amount of the elastomer component to 15 parts by mass.

Example 4

A bearing retainer and a test piece were produced by the same method as in Example 1 except for changing the elastomer component to Metablen S-2006 (available from Mitsubishi Rayon Co., Ltd.).

Example 5

A bearing retainer and a test piece were produced by the same method as in Example 1 except for changing the elastomer component to Kurarity LA2250 (available from Kuraray Co., Ltd.), which was a block copolymer of MMA and BA.

Example 6

A bearing retainer and a test piece were produced by the same method as in Example 1 except for changing the amount of the elastomer component to 1 part by mass.

Comparative Example 1

A bearing retainer and a test piece were produced by the same method as in Example 1 except for adding no elastomer component.

Drop Test

Onto the bearing retainer, a 1.3 kg weight was dropped from the height of 35.5 cm, 67.5 cm, or 93 cm above the bearing retainer, and it was determined if the bearing retainer was torn or not to perform qualitative evaluation of the impact resistance. The results are shown in "Impact resistance" of Table 1. For each height, the test was performed for five times. The case where no samples were torn was evaluated as "Excellent", the case where the samples were torn for 1 to 4 times was evaluated as "Somewhat poor", and the case where the samples were torn for 5 times was evaluated as "Poor".

Compression Test

As illustrated in FIG. 2, a bearing retainer 1 was sandwiched by spheres 3 arranged below and above the bearing retainer 1. The bearing retainer 1 was then placed on a compression testing device 4 that can be equipped on a universal tester (available from Toyo Seiki Seisaku-sho, Ltd.) and compressed in the arrow direction of FIG. 2 at the test speed of 5 mm/min to determine if the bearing retainer 1 was torn or not to perform qualitative evaluation of the compression resistance. Note that, in FIG. 2, only a part of the compression testing device 4 is illustrated. The results are shown in "Compression resistance" of Table 1. The test was performed for five times. The case where no samples were torn was evaluated as "Excellent", the case where the samples were torn for 1 to 3 times was evaluated as "Somewhat poor", and the case where the samples were torn for 4 or 5 times was evaluated as "Poor".

Charpy Impact Test

A sample was produced by cutting the multi-purpose test piece (JIS K 7139 type A1), and Charpy impact test (JIS K 7111) was performed to measure the impact strength. Note that a single notch having the shape A was formed on the sample by cutting, and the test was performed by edgewise impact.

The compositions of the resin compositions and the test results for Examples 1 to 6 and Comparative Example 1 described above are shown in Table 1.

TABLE 1

|  | Fluororesin | Elastomer component | Fluororesin part by mass | Elastomer component part by mass | Impact strength kJ/m² | Impact resistance | | | Compression resistance |
| --- | --- | --- | --- | --- | --- | --- | --- | --- | --- |
|  |  |  |  |  |  | 30.5 cm | 67.5 cm | 93 cm |  |
| Example 1 | PVDF | Paraloid EXL-2315 | 100 | 5 | 68.3 | Excellent | Excellent | Excellent | Excellent |
| Example 2 | PVDF | Paraloid EXL-2315 | 100 | 10 | 81.0 | Excellent | Excellent | Excellent | Excellent |
| Example 3 | PVDF | Paraloid EXL-2315 | 100 | 15 | 82.2 | Excellent | Excellent | Excellent | Excellent |
| Example 4 | PVDF | Metablen S-2006 | 100 | 10 | 88.6 | Excellent | Excellent | Excellent | Excellent |
| Example 5 | PVDF | Kurarity LA2250 | 100 | 10 | 93.3 | Excellent | Somewhat poor | Somewhat poor | Poor |
| Example 6 | PVDF | Paraloid EXL-2315 | 100 | 1 | 37.7 | Excellent | Poor | Poor | Somewhat poor |
| Comparative Example 1 | PVDF | Additive free | 100 | 0 | 25.3 | Somewhat poor | Poor | Poor | Poor |

INDUSTRIAL APPLICABILITY

The present invention can be suitably used in a bearing retainer of a ball screw.

REFERENCE SIGNS LIST

1 Bearing retainer
2 Through hole
3 Sphere
4 Compression testing device

The invention claimed is:

1. A separator configured to retain a plurality of spheres under a condition that the plurality of spheres are apart from each other;
   in a motion guide device comprising a first member and a second member configured to move relatively to the first member, the plurality of spheres being arranged on one of the first member or the second member and being in contact with both of the first member and the second member, and rolling of the plurality of spheres enabling the relative movement, and
   the separator comprising a resin composition containing a fluororesin and an elastomer component, the fluororesin containing vinylidene fluoride as a main component, wherein the elastomer component is dispersed in the fluororesin.

2. The separator according to claim 1, wherein the elastomer component is an elastomer combined with a compound compatible with the fluororesin.

3. The separator according to claim 2, wherein the elastomer combined with the compound compatible with the fluororesin is an elastomer having a core-shell structure.

4. The separator according to claim 2, wherein the compound compatible with the fluororesin is a fluororesin or an acrylic resin.

5. The separator according to claim 2, wherein the resin composition contains 1 part by mass or greater of the elastomer component per 100 parts by mass of the fluororesin containing the vinylidene fluoride as the main component.

6. The separator according to claim 1, wherein the elastomer component is an elastomer compatible with the fluororesin.

7. The separator according to claim 6, wherein the elastomer compatible with the fluororesin is an acrylic elastomer or a fluorine-based elastomer.

8. The separator according to claim 6, wherein the resin composition contains 5 parts by mass or greater of the elastomer component per 100 parts by mass of the fluororesin.

9. The separator according to claim 1, wherein the fluororesin is polyvinylidene fluoride.

10. A machine element comprising the separator described in claim 1, wherein the machine element comprises the plurality of spheres,
    wherein the plurality of spheres are retained by the separator under the condition that the plurality of spheres are apart from each other.

11. A motion guide device, comprising:
    a first member being at machine element comprising a separator and a plurality of spheres, wherein the separator is configured to retain the plurality of spheres under a condition that the plurality of sphere, are apart from each other, the separator comprising a resin composition containing a fluororesin and an elastomer component, the fluororesin containing vinylidenefluoride as a main component, wherein the elastomer component is dispersed in the fluororesin; and
    a second member being another machine element configured to move relatively to the first member,
    the plurality of spheres being arranged on one of the first member or the second member and being in contact with both of the first member and the second member, and rolling of the plurality of sphere enabling the relative movement, and
    the second member being combined with the first member under a condition that the second member is in contact with the plurality of spheres.

12. The motion guide device according to claim 11, wherein the motion guide device is a ball screw.

13. An industrial machine comprising the motion guide device according to claim 11.

* * * * *